July 24, 1934. H. CORY 1,967,811
VACUUM COFFEE BREWER
Filed July 26, 1933
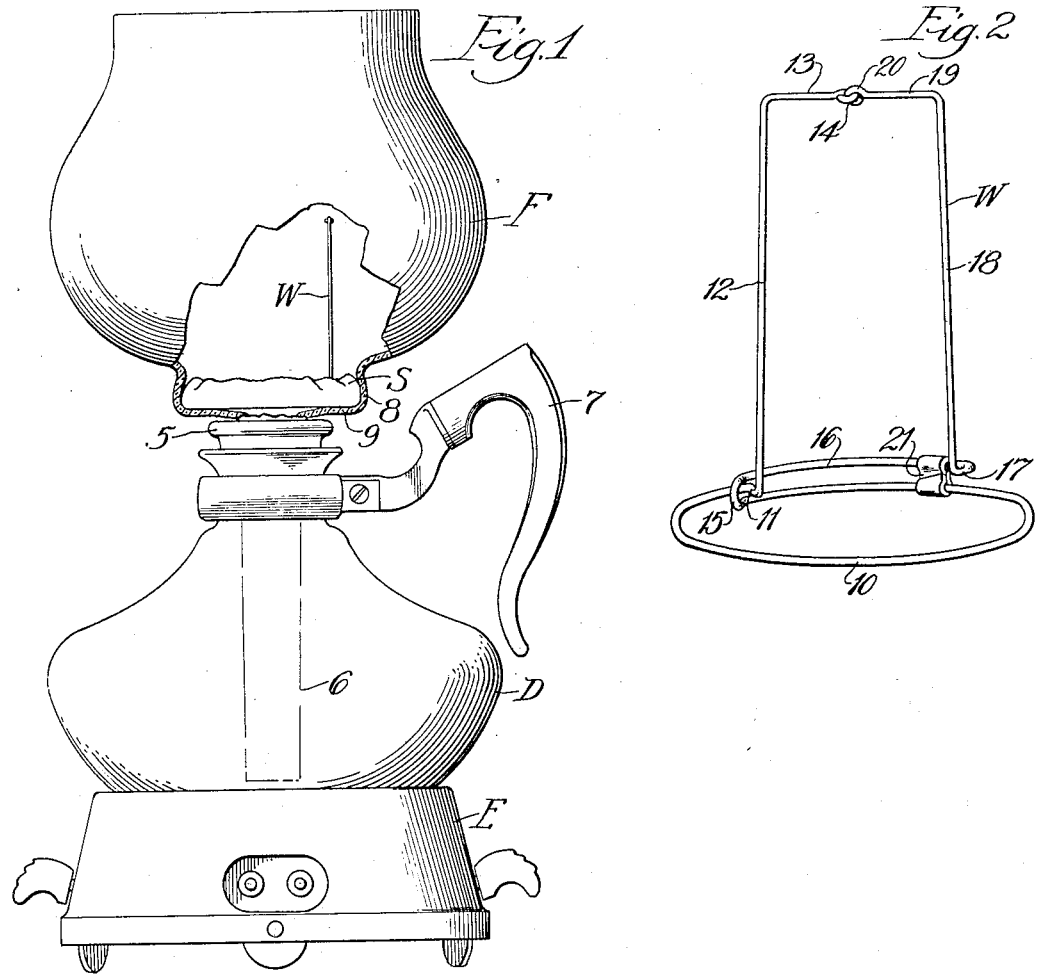
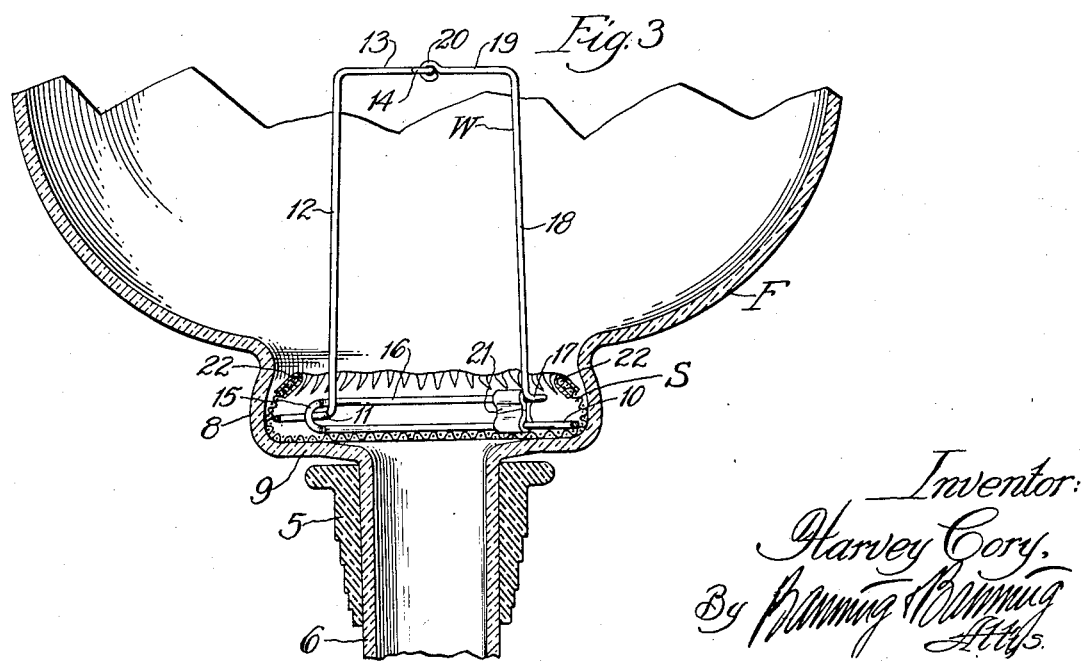
Inventor:
Harvey Cory,
By Banning Banning
Attys.

Patented July 24, 1934

1,967,811

UNITED STATES PATENT OFFICE 1,967,811

VACUUM COFFEE BREWER

Harvey Cory, Chicago, Ill.

Application July 26, 1933, Serial No. 682,233

3 Claims. (Cl. 53—3)

This invention relates generally to a coffee brewing utensil of the vacuum type in which is included a decanter and a funnel in sealed connection, the latter having a tubular stem depending into the decanter. More particularly the present improvements are directed to a filtering unit adapted for seating at the base of the funnel for straining fluid passing from the decanter to the funnel or vice versa.

It is an object of my invention to devise for the purpose noted a filter device which is simple in the extreme, inexpensive to produce, easy to clean, light to handle, and otherwise readily adaptable to meet the needs of a vacuum coffee brewer. My improved filter, together with the frame or mounting therefor, meets all these requirements, is easily anchored in position or removed therefrom, as desired, and provides a strainer element which will not readily clog and which may, with facility, be cleaned, removed or replaced. These and other objects of my invention are realized by the construction which is herein shown and described, one suggestive embodiment thereof being illustrated in the accompanying drawing, wherein—

Figure 1 is a side elevation of a vacuum coffee brewer, a portion of which is broken away to exhibit my improved filter unit therein;

Fig. 2 is a view in perspective of the filter frame or mounting for the strainer material; and Fig. 3 is an enlarged fragmentary view in section showing the filter unit seated within the funnel base.

The coffee brewer illustrated, which is of the vacuum type, comprises a decanter D adapted to be rested upon or over a heater E. Fitted within the neck of the decanter is a bushing 5 through which is extended a tubular stem 6 depending from a funnel F. A handle 7 may be connected to the neck of the decanter, as is usual.

The funnel stem which is open at its lower end, extends downwardly within the decanter close to its bottom. The base of the funnel is desirably provided with an annular wall 8, bowed outwardly by preference, to form a shoulder from which extends inwardly a ring-shaped wall forming a seat 9. The upper end of the stem may flare outwardly as required for connection with the seat. It will be understood that the decanter may be made of heat-proof glass in one piece, and that the funnel with its depending stem may also be produced in the same way of like material.

Formed for anchorage within the seat of the funnel is my improved filter unit which consists of a light frame W, desirably formed from a single piece of wire. In its intermediate portion the wire is bent into the form of a ring 10 one of whose ends is laterally turned at 11 and then extended in parallelism with the ring axis to provide a grip portion 12 whose extremity is bent laterally at 13, terminating in an eye 14. The opposite ring end is formed by a reverse bend 15 coacting with the laterally extended ring end 11 to limit expansion of the ring in response to spring tension exerted by the wire of which the frame is made. Proceeding from the reverse bend, the wire continues through an arcuate return portion 16 concentric with the adjacent portion of the ring; the wire is then laterally turned at 17 and from this point is extended in parallelism with the ring axis to provide a second grip portion 18 whose extremity is laterally bent at 19 terminating in an eye 20 which engages the eye 14 at the opposite wire end. The two laterally bent portions 11 and 17 proceed desirably in a radial direction so as to position the two grip portions 12 and 18 inside the periphery of the ring and in substantially parallel relation with each other and with the axis of the ring. Adjacent the laterally bent portion 17 is a clip 21 interconnecting in fast relation the return portion 16 and proximate portion of the ring. Contraction or expansion of the ring may accordingly take place only by relative arcuate movement of the overlapping portions of the ring adjacent the laterally bent portion 11. When the ring is contracted or expanded, the lower ends of the two grip portions 12 and 18 are moved away or toward each other respectively, and, because of the pivotal connection between the eyes 14 and 20 at the ends of the wire, this movement may proceed without any resistance other than that offered by the tension of the wire as confined to its ring portion.

The filter unit includes also a strainer S which may conveniently consist of a circular piece of appropriate fabric material having its edges drawn as by a string or cord 22. Such a strainer material then takes on the form of a shallow bowl having a large opening on its upper side. By contracting the ring of the frame, the strainer bowl may be fitted in place over the ring there to be held securely in place by expansion of the ring in response to the spring tension of the frame wire.

The filter unit is of such size and shape as to be receivable upon the seat 9. When so disposed the expansible ring of the frame fits snugly against the bowed shoulder 8 at every point throughout its periphery, so as to be anchored securely in position. The curvature or angle of the bow forming the shoulder may be in effect much the same as an under-bevel tending to force the filter unit downwardly into tight engagement with the funnel seat. The strainer material is then maintained snugly in position so as to prevent passage of material at any and every point around the filter unit. The construction described which is light and simple makes for a closer and tighter connection between the filter unit and its seat, the latter of which, in commercial practice, is often slightly uneven and irregular.

In operation, water is placed in the decanter, the funnel is fitted into position, and the filter unit with strainer attached, is then fitted under tension into the seat provided for this purpose. Coffee, which is preferably pulverized, is then poured into the funnel to the desired level. The water in the decanter is then heated, and upon reaching a temperature of about 180° F., produces a steam pressure which forces the water upwardly within the tubular stem and through the strainer. Regardless of the pressure, the filter unit will remain immovable in its seat, so as to strain the liquid which is required to pass through the strainer element. The upflow of water may continue until all the water above the bottom of the stem has been forced into the upper portion of the funnel. At this point the heat should desirably be shut off. As the decanter cools, the resulting vacuum, or minus pressure, draws back the water which is in the funnel. In this return or downflow, the water passes through the strainer once more before entering the decanter. In practice, the water need not remain in the funnel more than two minutes.

With the filter unit of my invention, a minimum of resistance is offered to the passage of liquid moving either up or down. This is due in large part to the lack of any obstruction offered by the frame upon which the strainer material is carried. Because of the bag form of the strainer and of its smooth fit upon the ring of the frame, I avoid wrinkles and puckers of the material, and thereby ready straining of the fluid is assured so that the entire brewing operation may be performed in a minimum of time.

The filter unit is further advantageous in that the ends of the wire frame are upwardly extended to form grip portions which cool off rapidly following the downflow of the liquid from the funnel into the decanter. The grip portions are presented inwardly of the frame ring so as to be readily accessible to the operator who is enabled to contract the ring, thereby freeing the filter unit from its anchorage within the seat. When so manipulated the filter unit may readily be removed from the funnel for purposes of cleansing, replacement, or otherwise.

I claim:

1. In a coffee brewer including a decanter to which is fitted a funnel provided with a continuous seat having a surrounding shoulder, a filter unit comprising a bowl-shaped strainer of flexible material having a closed bottom together with sides having inwardly turned edges to provide an open top and a spring frame formed to fit inside the strainer sides and extend continuously beneath the turned edges thereof and normally expansible therewithin to maintain the strainer under tension with the sides thereof pressed at every point against the shoulder surrounding the seat when the filter is operatively positioned therewithin and a handle extending inwardly from the frame through a distance comparable with the inwardly turned edges of the strainer and then upwardly from the frame past the strainer to furnish a grip for the filter unit.

2. In a coffee brewer including a decanter to which is fitted a funnel provided with a continuous seat having a surrounding shoulder, a filter unit comprising a circular strainer of flexible material having its edges drawn to provide a bowl-like form with an opening across the top, and a spring-ring having slidably connected ends formed to fit inside the strainer sides and extend continuously around within the drawn edges thereof and normally expansible therewithin to maintain the strainer under tension with its sides pressed at every point against the shoulder surrounding the seat when the strainer is operatively positioned therewithin, and a handle extending inwardly from the ring and thence upwardly past the strainer to furnish a grip for the filter unit.

3. In a coffee brewer including a decanter to which is fitted a funnel provided with a continuous seat, a filter unit comprising a one piece wire frame formed at one point into a circumferentially expansible ring having overlapping slidably connected portions from the ends of which other portions extend to provide grips by which the ring may be circumferentially contracted, the frame ring being receivable within the seat of the funnel and tending by its own spring action to expand circumferentially whereby to press tightly against the seat at every point circumferentially thereof a flexible strainer which is fitted over the ring.

HARVEY CORY.